United States Patent
Kahn et al.

(10) Patent No.: US 8,587,601 B1
(45) Date of Patent: Nov. 19, 2013

(54) SHARING OF THREE DIMENSIONAL OBJECTS

(75) Inventors: Philippe Kahn, Aptos, CA (US); Arthur Kinsolving, Santa Cruz, CA (US); Andrew Thomas Wallacker, Santa Cruz, CA (US)

(73) Assignee: DP Technologies, Inc., Scotts Valley, CA (US)

( * ) Notice: Subject to any disclaimer, the term of this patent is extended or adjusted under 35 U.S.C. 154(b) by 868 days.

(21) Appl. No.: 12/348,906

(22) Filed: Jan. 5, 2009

(51) Int. Cl.
*G09G 5/00* (2006.01)
*G06T 15/10* (2011.01)

(52) U.S. Cl.
USPC .......................................... 345/582; 345/427

(58) Field of Classification Search
None
See application file for complete search history.

(56) References Cited

U.S. PATENT DOCUMENTS

| | | | |
|---|---|---|---|
| 6,115,717 A * | 9/2000 | Mehrotra et al. | 1/1 |
| 6,347,290 B1 | 2/2002 | Bartlett | |
| 6,353,449 B1 | 3/2002 | Gregg et al. | |
| 6,834,249 B2 | 12/2004 | Orchard | |
| 7,457,719 B1 | 11/2008 | Kahn et al. | |
| 7,487,463 B2 * | 2/2009 | Johnson | 715/781 |
| 7,526,402 B2 | 4/2009 | Tanenhaus et al. | |
| 7,608,050 B2 | 10/2009 | Sugg | |
| 7,647,196 B2 | 1/2010 | Kahn et al. | |
| 7,653,508 B1 | 1/2010 | Kahn et al. | |
| 7,892,080 B1 | 2/2011 | Dahl | |
| 8,253,739 B2 * | 8/2012 | Hassenpflug | 345/427 |
| 2003/0109258 A1 | 6/2003 | Mantyjarvi et al. | |
| 2005/0046639 A1 | 3/2005 | Leather | |
| 2005/0202934 A1 | 9/2005 | Olrik et al. | |
| 2005/0212767 A1 | 9/2005 | Marvit et al. | |
| 2005/0219223 A1 | 10/2005 | Kotzin et al. | |
| 2005/0222801 A1 | 10/2005 | Wulff et al. | |
| 2006/0149516 A1 | 7/2006 | Bond et al. | |
| 2006/0164382 A1 | 7/2006 | Kulas et al. | |
| 2006/0181537 A1 * | 8/2006 | Vasan et al. | 345/473 |
| 2006/0284979 A1 | 12/2006 | Clarkson | |
| 2007/0073482 A1 | 3/2007 | Churchill et al. | |
| 2007/0125852 A1 | 6/2007 | Rosenberg | |
| 2007/0130582 A1 | 6/2007 | Chang et al. | |
| 2007/0145680 A1 | 6/2007 | Rosenberg | |
| 2007/0213126 A1 | 9/2007 | Deutsch et al. | |
| 2007/0259716 A1 | 11/2007 | Mattice et al. | |
| 2007/0259717 A1 | 11/2007 | Mattice et al. | |
| 2007/0260482 A1 | 11/2007 | Nurmela et al. | |

(Continued)

OTHER PUBLICATIONS

Anderson, Ian, et al, "Shakra: Tracking and Sharing Daily Activity Levels with Unaugmented Mobile Phones," Mobile Netw Appl, Aug. 3, 2007, pp. 185-199.

(Continued)

*Primary Examiner* — Joni Richer
*Assistant Examiner* — Michelle Chin
(74) *Attorney, Agent, or Firm* — Blakely, Sokoloff, Taylor & Zafman LLP; Judith A. Szepesi (57) ABSTRACT

A method and apparatus comprising a design tool to enable the design of a three dimensional object including a plurality of faces and a plurality of vertices. The apparatus further comprising a skinner to generate a two dimensional image file including the plurality of faces from the three dimensional object, and a communications tool to send the two dimensional image file and associated structure data to a recipient using a messaging protocol. The apparatus further comprising a builder to utilize a received two dimensional image file and associated structure data to generate a received three dimensional object.

17 Claims, 8 Drawing Sheets

(56) References Cited

U.S. PATENT DOCUMENTS

| | | | |
|---|---|---|---|
| 2007/0269198 A1* | 11/2007 | Park et al. | 396/322 |
| 2008/0010539 A1 | 1/2008 | Roth | |
| 2008/0028341 A1* | 1/2008 | Szeliski et al. | 715/854 |
| 2008/0174598 A1* | 7/2008 | Risenhoover | 345/419 |
| 2009/0124348 A1 | 5/2009 | Yoseloff et al. | |
| 2009/0310851 A1* | 12/2009 | Arcas et al. | 382/154 |

OTHER PUBLICATIONS

Aylward, Ryan, et al, "Sensemble: A Wireless, Compact, Multi-User Sensor System for Interactive Dance," International Conference on New Interfaces for Musical Expression (NIME06), Jun. 4-8, 2006, pp. 134-139.

Frisvad, Jeppe Revall, et al, "Lighting Effects for Mobile Games," In Proceedings of {SIGRAD}, 2005, 6 pages.

Hemmes, Jeffrey, et al, "Lessons Learned Building TeamTrak: An Urban/Outdoor Mobile Testbed," 2007 IEEE Int. Conf. on Wireless Algorithms, Aug. 1-3, 2007, pp. 219-224.

Hwang, Jane, et al, "Hand-Held Virtual Reality: A Feasibility Study," In Proceedings of the ACM Symposium on Virtual Reality Software and Technology (VRST '06), 2006, pp. 356-363.

Jacorre Design Studio, "Animated Shine," <http://replay.waybackmachine.org/20070522062535/http://www.jacorre.com/design/animiatedshine.htm>, Archived May 22, 2007, Retrieved Apr. 5, 2011, 9 pages.

MacGregor, Ken, et al, "MuttZ: An Interactive Cellphone Game," Technical Report CS04-26-00, Department of Computer Science, University of Cape Town, Oct. 21, 2004, 4 pages.

* cited by examiner

Fig. 7

SHARING OF THREE DIMENSIONAL OBJECTS

FIELD OF THE INVENTION

The present invention relates to three dimensional illustrations, and more particularly with enabling users to create and share such three dimensional objects.

BACKGROUND

Computer graphics are enabling the creation of complex images, including the appearance of three-dimensionality. Although these objects are shown on a two dimensional screen, they are generally referred to as three dimensional objects. This terminology will be used in this patent.

Users are creating customized graphics in various games and other applications. For example the SPORE® game by EA (Electronic Arts) allows users to create creatures by constructing them from a number of elements (e.g. selecting one of a dozen available five fingered claws) and resizing and adding from a palette of available colors and/or patterns. Users enjoy sharing such objects. SPORE® permits the sharing of these creatures by taking a "postcard" of the creature, which creates an image in PNG format. The PNG formatted image file includes data regarding each of the elements used, and any modifications to them.

When a user takes the PNG postcard, and puts it into his or her creature creator, the creature creator uses the data in the PNG postcard to re-create the creature, based on the identification of the elements used and their modifications.

SUMMARY

A method and apparatus comprising a design tool to enable the design of a three dimensional object including a plurality of faces and a plurality of vertices. The apparatus further comprising a skinner to generate a two dimensional image file including the plurality of faces from the three dimensional object, and a communications tool to send the two dimensional image file and associated metadata to a recipient using a messaging protocol. The apparatus further comprising a builder to utilize a received two dimensional image file and associated metadata to generate a received three dimensional object.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The method and apparatus described is a tool for enabling a user to design and share user-designed three dimensional objects. In one embodiment, the three dimensional objects include a mesh (also referred to as a skeleton or frame) including a plurality of vertices, and skin (also referred to as overlay or image layer). The mesh defines the dimensionality of the object, while the skin is the graphics shown on the object. The system includes a design tool, in one embodiment. The user can design one or more areas on the three dimensional object, including adding textures, images, text, creating drawings, mash-ups, or otherwise designing the skin, or portions of the skin.

The system further comprises a skinner which generates a two dimensional surface from the three dimensional object. In one embodiment, the two dimensional surface is used in the design phase, e.g. the user utilizes the flat surface to design the graphics. In one embodiment, the two dimensional surface used in design includes the entirety of the skin, e.g. all faces and facets of the mesh. For example, for a die, the skinner may create a file that resembles the cross shape of an unwrapped die. In one embodiment, if a user wishes to share a design that is only slightly modified, for example one face on a six sided die, the skinner may further generate a "sub-skin" which includes only a portion of the skin, with data indicating which portion of the skin it represents.

In one embodiment, the system further includes a communications tool to send the two dimensional image file, and associated metadata if appropriate, to a recipient. In one embodiment, the communications tool utilizes an MMS (multi-media messaging) message to send the object from one user to another. In one embodiment, the communications tool uses a built-in photo sharing messaging tool in a mobile device. For example, mobile devices may have special communications mechanisms for sharing photographs, such as Sprint PCS Picture Mail®. In one embodiment, the communications tool uses electronic mail (email). In one embodiment, the communications tool uses web mail. In one embodiment, the communications tool uses a browser tool which enables the user of the mobile system to send messages to other users. In another embodiment, the message may be sent to the server, and the server may send the message on to the other user.

In one embodiment, communications tool constructs a message from the skin which can be sent using the photo sharing tool. In one embodiment, the communications tool accesses the "image store" of the system, and enables a user to manually select and send the skin or subskin to share with another user.

In one embodiment, the apparatus further includes a builder tool to utilize a received image file and based on the image file, to regenerate the three dimensional object. In one embodiment, the builder tool uses metadata sent along with the image. In another embodiment, the metadata is embedded in the image itself. In another embodiment, the skin format itself provides sufficient information. For example, for constructing platonic solid, a flat-laid skin provides enough data, if the "fold lines" are indicated. Therefore, in some instances no metadata may be required if the mesh is restricted to platonic solids or equivalent forms. In one embodiment, the build tool may be part of a separate application from the design and sharing tool. For example, an application capable of using the three dimensional objects—for example a game that can use three dimensional dice—may include a builder tool. Thus, in one embodiment, a user receiving a designed 3D object need not have the design and sharing tool installed in order to receive and utilize 3D objects.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
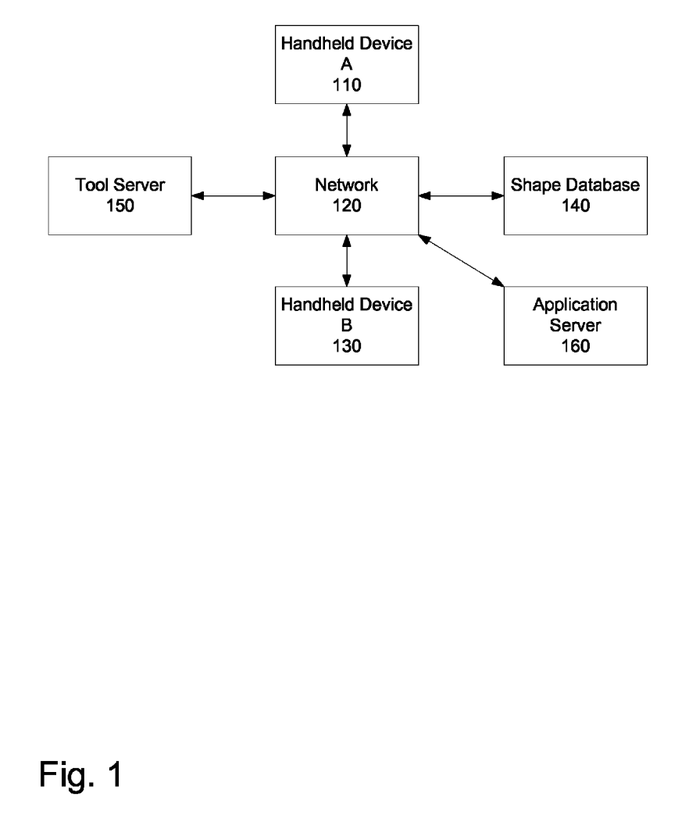
FIG. 1 is a block diagram of a network in which the present system can be implemented.

FIG. 1 is a block diagram of a network in which the present system can be implemented. The network includes a handheld device 110, which can connect to a network 120. In one embodiment, the handheld device 110 is a mobile phone, which connects to network 120 through a mobile phone network (e.g. GSM, CDMA, iDEN, PDC, etc.) The handheld device 110 in one embodiment can download an object design/share tool from Tool server 150. In another embodiment, handheld device 110 may come preloaded with object design/share tool.

In one embodiment, once the object design/share (ODS) tool has been loaded onto the handheld device 110, a user of the device can utilize the ODS tool to customize three dimensional objects. In one embodiment, the basic object shapes may be included in the ODS tool. In one embodiment, basic object shapes may be obtained from the tool server 150 or another source available over the network. The customization of the three dimensional object may include freehand sketching, pasting, clip art, photographs, utilizing image manipulation tools of various sorts, overlaying multiple layers of image data, adding sparkle or other effects, adding moving images effects, or any other design mechanisms which are known in the art. In one embodiment, the handheld device 110 can utilize the ODS tool to generate any design.

The ODS tool further includes in one embodiment the ability to generate a packaged message, or a flat image file including any metadata needed to recreate the designed 3D image. The flat image file is a static image, which in one embodiment can be stored in a photo application. In one embodiment, the flat image file may consist of multiple images, and metadata showing the animation between the images.

A recipient handheld device 130 may receive the image file including the metadata. In one embodiment, a standard messaging protocol is used to send the message from the first handheld device 110 to a second handheld device 130. That messaging protocol may be a multimedia messaging system message (MMS message).

In one embodiment, if the message is sent to a new recipient (e.g. one that had not previously received such 3D object sharing data from the user), the message includes an indicator that downloading the ODS tool is recommended. In one embodiment, the ODS tool recommendation is in the email regardless of whether this user has received such a mail before. For example, in one embodiment, the text may include language such as "You have received a unique 3D object designed by 'sender'. You can open this design in 'application' (click here to download) and you can alter this design, or create your own design using 'ODS tool' (click here to download)." Thus, the user may easily download an application which can utilize the 3D object, such as a game. For example, in one embodiment, the 3D object is a die to be utilized in a dice game. The users may share dice. In one embodiment, ODS tool is utilized to design the dice, but the dice may also be used in associated games (e.g. dice game applications). The 3D object may be an avatar to be used in an online world, a vehicle used in a racing game, a decorative object displayed on the user's system, or anything else.

In one embodiment, applications may be downloaded from application server 160. In one embodiment, application server 160 may also include the ODS tool. In one embodiment, application server 160 and tool server 150 may be the same server.

Figure 2:
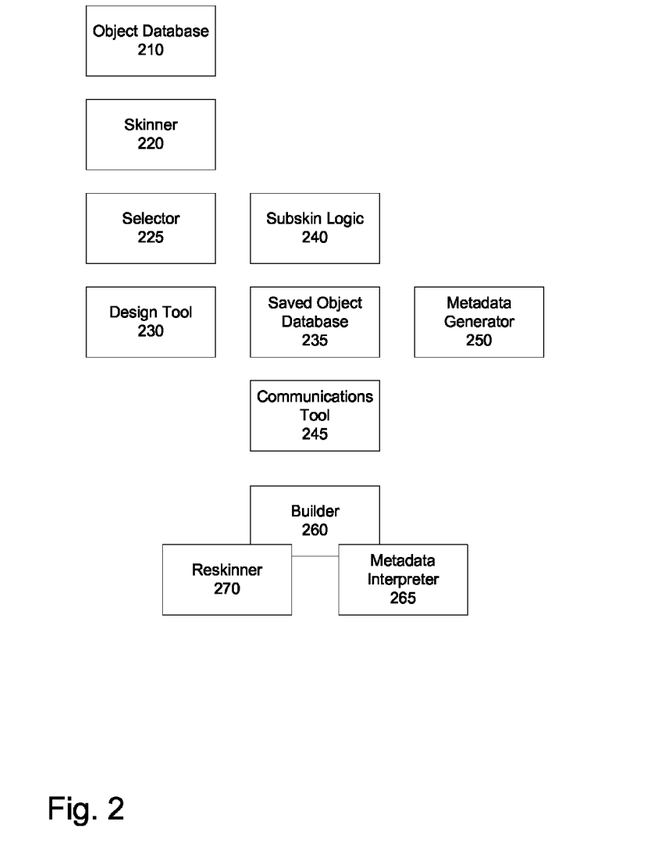
FIG. 2 is a block diagram of one embodiment of an object sharing tool.

FIG. 2 is a block diagram of one embodiment of an object design/share (ODS) tool. The tool includes a skinner 220 to generate a two-dimensional representation of the skin of a three dimensional object. The three dimensional objects, in one embodiment, are stored in the object database 210. In one embodiment, the object database 210 is available via a network connection or otherwise remotely accessed. In another embodiment, the object database is a local database. In one embodiment, object database 210 is a local subset of a server-based database. In one embodiment, the object database 210 defines what objects are available for customization.

Selector 225 enables the user to select a subpart of the entire skin for customization.

The user can then design the customized 3D object by utilizing any design tools 230. These design tools may include tools to draw, color, shade, cut, paste, texture, add effects, or otherwise alter the skin. In one embodiment, design tool 230 may utilize images, textures, or other materials available in other applications.

The subskin logic 240 processes the selection from selector 225. In one embodiment, subskin logic 240 generates the metadata that describes the subskin's location on the entire skin. This, in one embodiment, is generated when a design which includes only a relatively small percentage of the entire skin is being stored. For example, in one embodiment, this occurs when less than 25% of the entire skin is customized.

The customized 3D objects are saved in saved object database 235. In one embodiment, saved object database 235 corresponds to a location which is available for saving image data. In one embodiment, this may be a photo storing application.

In one embodiment, metadata generator 250, or structure data generator 250 creates the metadata used to reconstruct the 3D object from the image data. The combination of the skin image data and the structure data are sufficient to provide the ability to construct the customized 3D object. In one embodiment, the structure data is included with the image data as metadata, e.g. data associated with the image but not part of it. In one embodiment, the image data is treated as a photograph, and the metadata is encoded using the IPTC Photo Metadata 2008 standard. In one embodiment, the metadata is compliant with the Information Interchange Model (IIM) standard.

In another embodiment, the structure data is embedded within the image itself. The embedding of data invisibly to a user within an image is known in the art. Any method known may be utilized.

Communications tool 245 interfaces to communications application(s) available in the mobile device. In one embodiment, the communications application is a messaging tool built into the mobile device. In one embodiment, the messaging tool is a multimedia messaging system (MMS) messaging tool. Communications tool 245 in one embodiment enables the user to send the image and structure data using the existing messaging capabilities of the mobile system. In one embodiment, communications tool 245 provides instructions to the user, if the saved object database 235 is not available from within the system.

The system may further include a builder 260 which has as its components a metadata interpreter 265 and a reskinner 270. In one embodiment, builder 260, reskinner 270, and metadata interpreter 265 may also be available as part of a separate system. For example, an application which can utilize the custom 3D objects may include the builder 260.

When an image is received by builder 260, the structure data—embedded in the image, included as metadata, or separately provided—is obtained by metadata interpreter 265. Metadata interpreter 265 uses the structure data to generate a mesh. In one embodiment, the metadata interpreter 265 uses the actual structure data (e.g. the structure data defines the vertices and faces, and the angles between faces) to generate the 3D object. In another embodiment, the metadata uniquely identifies a 3D object structure in object database 210. In another embodiment, the metadata may identify the shape, dimensions, and unique characteristics. For example, the metadata may say "square, 1" faces, sharp edges." This uniquely identifies a 3D object, without provide any further data. Alternative methods of defining the 3D object's mesh may be utilized.

Reskinner 270 then overlays the image data (skin or subskin) on the mesh. The builder then makes the fully generated custom 3D object available for use. In one embodiment, multiple applications may share the builder 260. And once a custom 3D object is created, it is saved in saved object database 235. From the saved object database 235, in one embodiment, any application capable of utilizing the custom 3D object may obtain it and utilize it. For example, if the custom 3D object is a die, a gaming application, as well as a decision making application may be able to use the 3D object.

Figure 3:
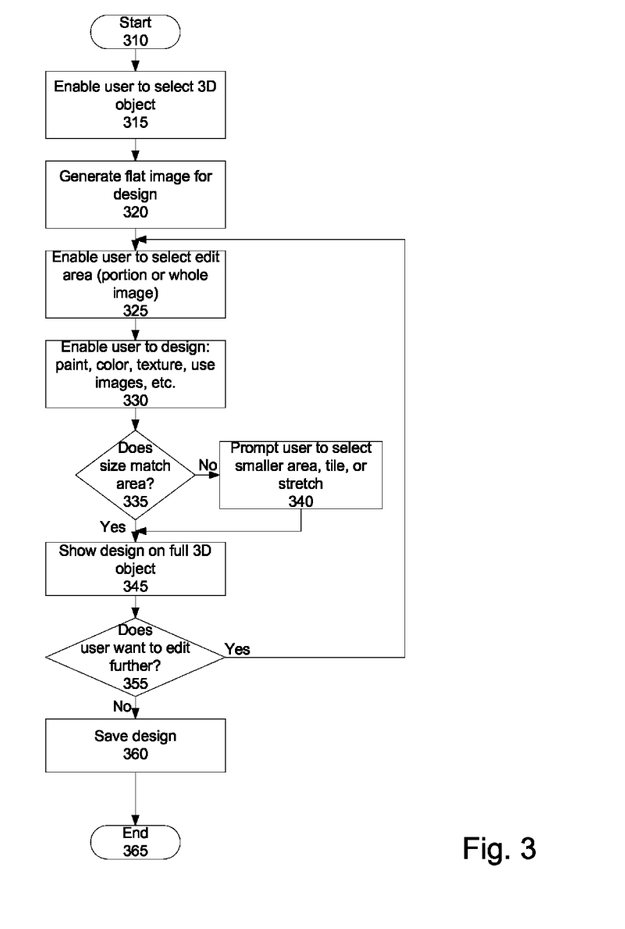
FIG. 3 is a flowchart of one embodiment of designing an object.

FIG. 3 is a flowchart of one embodiment of designing an object. The process starts at block 300. In one embodiment, the process starts when the user opens the ODS tool. At block 315, the user may select a 3D object for design. In one embodiment, the tool includes multiple possible 3D objects. In one embodiment, the user may select a mesh only (e.g. a 3D object with no graphical components, merely a defined frame). In one embodiment, the user may select an existing 3D object to modify. In one embodiment, the available 3D objects are kept on a shape server, and the tool accesses the shape server to display the available 3D objects to the user. In one embodiment, the available 3D objects are locally stored within the ODS tool. In one embodiment, the user may browse 3D objects by type. In one embodiment, the browsing interface first permits the user to select the object type (e.g. avatar, dice, platonic object, puzzle element, etc), then the particular device (e.g. once dice are selected the user may select standard 6 sided dice, casino 6 sided dice, 20 sided dice, etc.) In one embodiment, the user may move up and down the selection tree, until he or she clicks "OK."

In one embodiment, a default selection is highlighted for each step, so that the user may simply click "OK" without having to browse. In one embodiment, there may be a quick start menu. In one embodiment, the quick start menu for the user may be selected based on the applications on the user's system. In one embodiment, the quick start menu for the user may be selected based on the application through which the user entered the ODS tool. Once this selection is done, the process continues to block 320.

At block 320, the flat skin is generated for the selected 3D object. As is known in the art, any 3D object with multiple faces and vertices can be laid flat (although there may be gaps in the image, based on the shape of the underlying object). In one embodiment, the user is presented with a drawn outline of the skin, on a standard page.

At block 325, the user can select an edit area. In one embodiment, the default edit area is the entire shape. In one embodiment, the default edit area is one face. In one embodiment, the user may select any area for designing. In one embodiment, the area selected need not overlap with the actual shape outline. For example, for a standard six sided die, the shape outline resembles a T, with three blocks across and four down. The user may select an area for design that encompasses space that is not part of the shape.

Figure 6A:
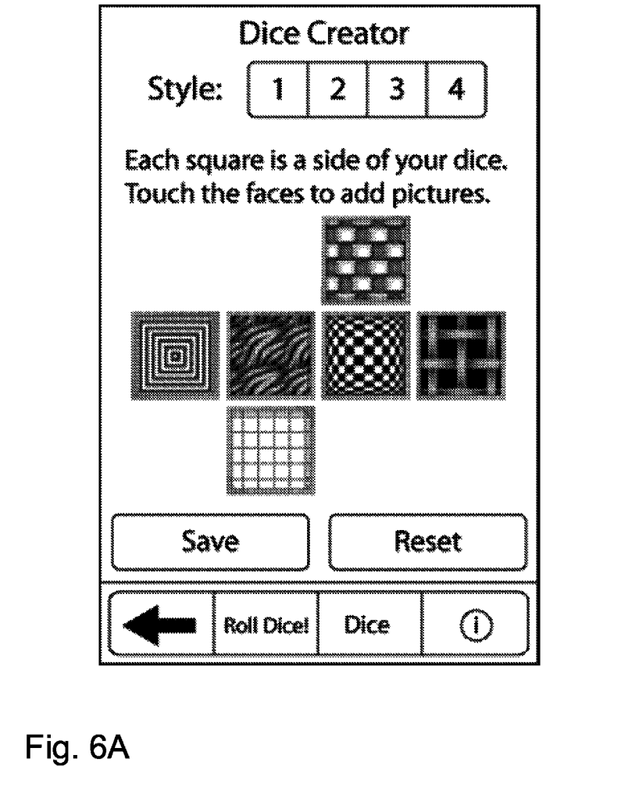
FIGS. 6A-6B show exemplary screen shots of the ODS tool.

At block 330, the user can design the 3D object skin. The design tools used may range from painting tools, to image manipulation tools, to cut/paste/edit/etc. tools. In one embodiment, tools may include motion effects, sparkle effects, and similar features as well. In one embodiment, the user may utilize photographs or other images. In one embodiment, the user may access images from the Internet, a computer, or the handheld device itself for this design process. FIG. 6A illustrates one embodiment of a die shape being edited. The edits shown may be done by selecting each of the faces separately, and applying appropriate effects, in one embodiment.

Once the user finishes the design phase, he or she indicates this, and the process continues. In one embodiment, the ODS tool enables the user to save works in progress. In one embodiment, the ODS tool automatically saves works in progress in a folder, or similar structure. In one embodiment, if the user has one or more works in progress, the quick start menu may provide access to such projects.

At block 335, the process determines whether the user's design covers the entire area selected. If not, at block 340 the user can select a smaller area (e.g. move the selected portion, or tile, stretch, or otherwise adjust the design to fit the selected portion. In one embodiment, this process may be automatic, and the design is auto sized/cropped to fit the selected area.

Figure 6B:
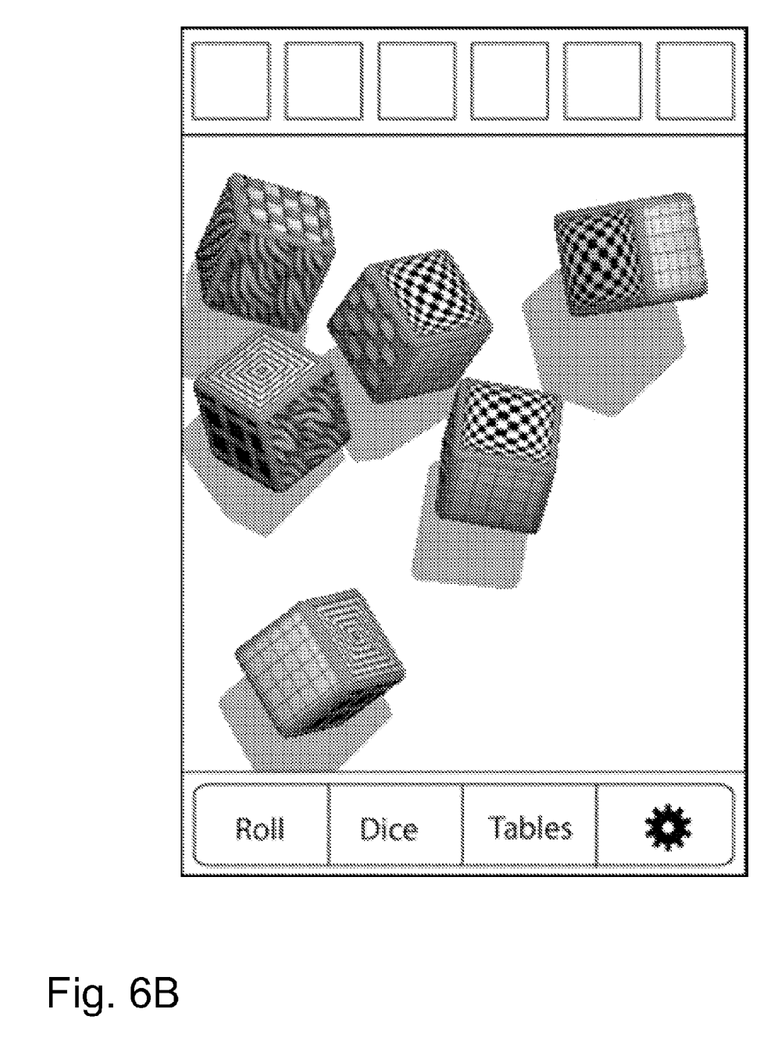

At block 345, the design is optionally shown on the full 3D object. In one embodiment, this option may be selected by the user. In one embodiment, the 3D object is interactive, so that the user can see all sides. FIG. 6B illustrates one embodiment of the display that is shown to the user. In one embodiment, the user can interact with the design as it would be used in a game or other application. This ensures that the user is satisfied with the appearance of the object in actual use.

At block 350, the process determines whether the user wishes to further edit the skin. If so, the process returns to block 325, to enable the user to select a portion of the skin to edit. Otherwise, at block 360 the design is saved. The design process then ends, at block 365. In one embodiment, the user may end the design process at any time, and save or discard the design.

Figure 4:
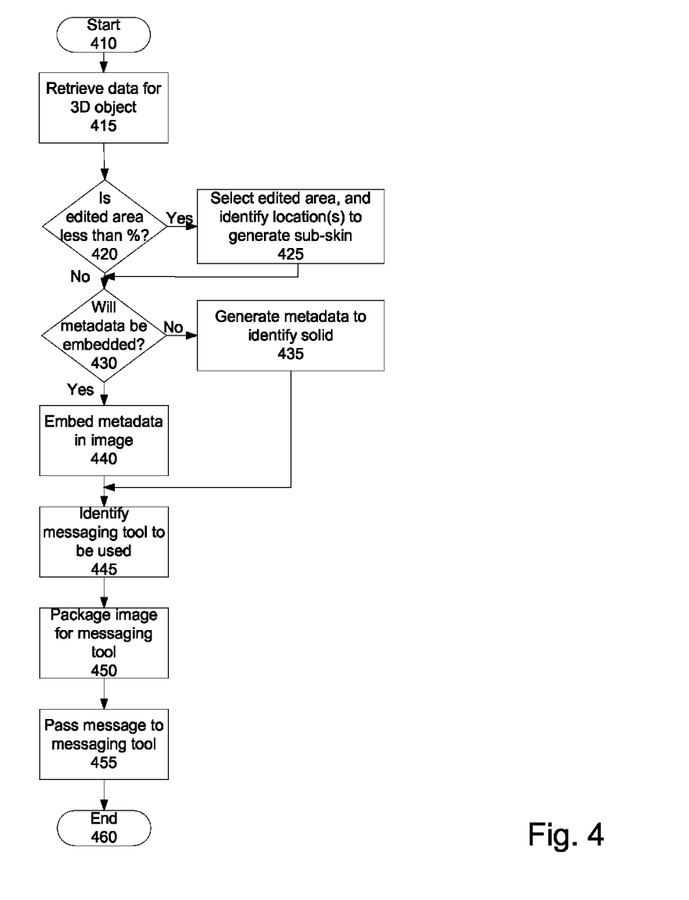
FIG. 4 is a flowchart of one embodiment of constructing a message from the object, for sharing.

FIG. 4 is a flowchart of one embodiment of sharing the designed object. In one embodiment, the user may select an object to share. In one embodiment, the object may be an object designed by the user. Alternatively, in one embodiment pre-designed objects, or objects downloaded or obtained from others may also be shared.

At block 415, the data for the 3D object is retrieved. In one embodiment, the data is stored in a database. In one embodiment, the data is saved in a photo application on the device, with the 3D mesh data stored as metadata with the image file.

At block 420, the process determines whether the edited area of the image is less than a certain percentage. In one embodiment, that percentage is 30%. If so, instead of transmitting the entire skin, in one embodiment, only the relevant portion of the image is transmitted. In one embodiment, each face of the image which has been edited is selected, and transmitted. In another embodiment, the shape of the transmitted image need not match the shape of the faces. The selected area is referred to as a sub-skin. In one embodiment, the system stores the entire skin, and the sending process selects the subskin. In another embodiment, only the subskin is stored if the edits are sufficiently small in percentage. In one embodiment, therefore, the decision on skin v. subskin for storing and/or sharing is made at the storing step.

At block 430, the process determines whether the structure data is embedded in the image, or sent as metadata. In another embodiment, the structure data (e.g. the data defining the three dimensional structure may be sent separately, or may be skipped entirely for certain platonic solids. In on embodiment, this depends on the messaging protocol used. In one embodiment, this depends on settings or user preferences.

If the structure data is not being embedded, at block 435 the structure data is attached to the image as metadata. Otherwise, at block 440, the structure data is embedded in the image. Embedding data in an image file is known in the art.

The process then continues to block 445. At block 445, the messaging tool is identified. In one embodiment, the messaging tool is selected from among the available messaging tools. In one embodiment, the default format is the multimedia messaging service (MMS) format. In one embodiment, the user may select a messaging tool. As noted above, the messaging tool may be a built in messaging tool, an email tool, a webmail tool, a browser tool, or any other messaging interface which can be used within the mobile system.

At block 460, the message including the image and structure data is passed to the messaging tool. In one embodiment, the message further includes user-readable text. In one embodiment, the message may include instructions on how to utilize the 3D object received.

In another embodiment, the user is prompted to select the image from the image store and from there initiate the messaging tool manually to share the 3D object. The process then ends.

Figure 5:
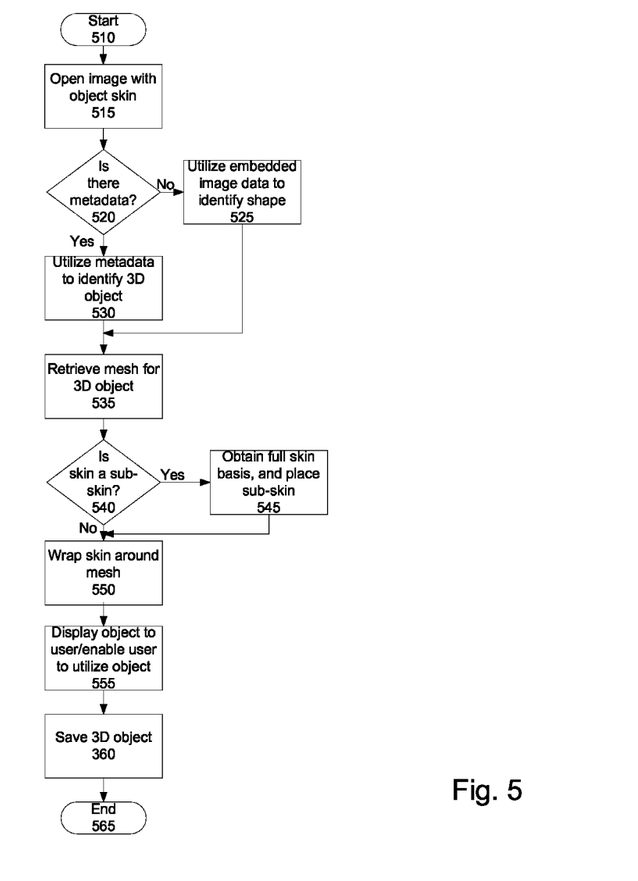
FIG. 5 is a flowchart of one embodiment reconstructing the image based on the message.

FIG. 5 is a flowchart of one embodiment of receiving a 3D object. The process starts at block 510. At block 515, the message including the 3D object data/image is opened. In one embodiment, the message is opened from the ODS tool or another application which is designed to work with the 3D objects. In one embodiment, the message is opened in a messaging tool. In one embodiment the image is manually or automatically saved in an image folder. The image is then opened in an ODS tool, or another application which can utilize the 3D objects.

At block 520, the process determines whether there is metadata with the image. If there is metadata, at block 530, the metadata is utilized to identify the 3D object associated with the image. If there is no metadata, the structure information is embedded in the image. Therefore, at block 525, the embedded image data is used to identify the 3D object mesh.

At block 535, the mesh is retrieved or constructed for the object. In one embodiment, the ODS tool or application includes a library of available meshes, which are retrieved. In one embodiment, the 3D mesh may be retrieved from a server. In one embodiment, the mesh data is fully encoded within the metadata/embedded data and no additional information is retrieved or used.

At block 540, the process determines whether the skin received is a full skin or a sub-skin. If it is a subskin, at block 545, the full skin used as a basis for the design is retrieved, and the subskin is overlaid in the indicated location. The process then continues to block 550. If the skin is a full skin, the process continues directly to block 550.

At block 550, the full skin is wrapped around the mesh, creating a 3D object. At block 555, the 3D object is made available to the user. In one embodiment, the object is displayed to the user.

At block 560, the 3D object is saved in the user's list of available 3D objects, for various applications/tools/games. The process then ends at block 565. In one embodiment, regardless of which application the user utilizes to generate the 3D object, the 3D object becomes available for all applications which can use the 3D object.

Figure 7:
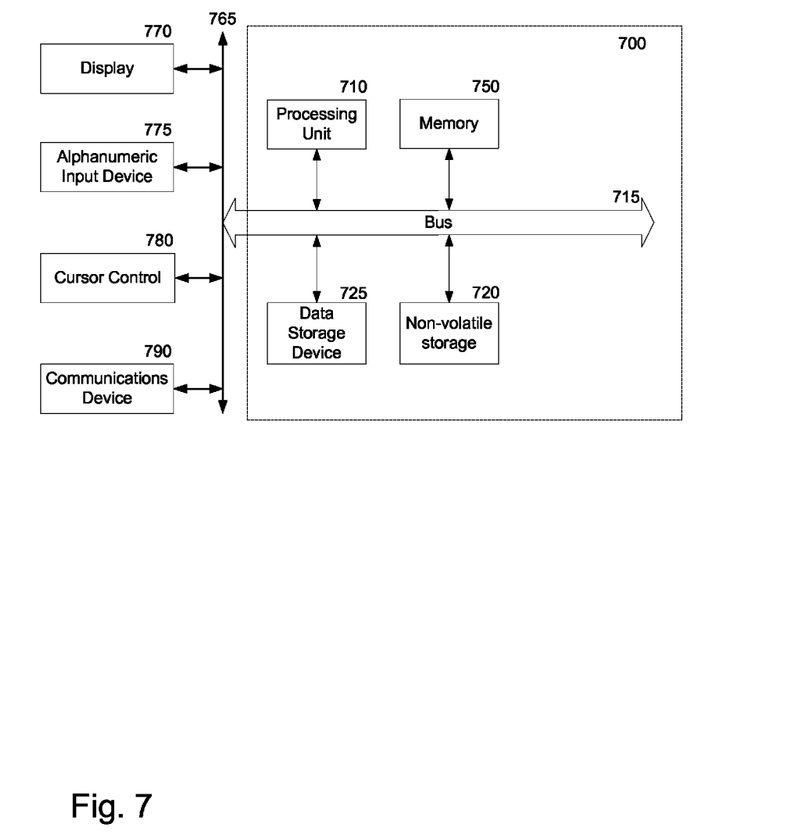
FIG. 7 is a block diagram of one embodiment of a computer system which may be utilized with the present invention.

FIG. 7 is a block diagram of one embodiment of a computer system which may be utilized with the present invention. It will be apparent to those of ordinary skill in the art, however that other alternative systems of various system architectures may also be used.

The data processing system illustrated in FIG. 7 in one embodiment includes a bus or other internal communication means 715 for communicating information, and a processor 710 coupled to the bus 715 for processing information. The system further comprises a random access memory (RAM) or other volatile storage device 750 (referred to as memory), coupled to bus 715 for storing information and instructions to be executed by processor 710. Main memory 750 also may be used for storing temporary variables or other intermediate information during execution of instructions by processor 710. The system also comprises a read only memory (ROM) and/or static storage device 720 coupled to bus 715 for storing static information and instructions for processor 710, and a data storage device 725 such as a magnetic disk or optical disk and its corresponding disk drive. Data storage device 725 is coupled to bus 715 for storing information and instructions.

The system may further be coupled to a display device 770, such as a cathode ray tube (CRT) or a liquid crystal display (LCD) coupled to bus 715 through bus 765 for displaying information to a computer user. An alphanumeric input device 775, including alphanumeric and other keys, may also be coupled to bus 715 through bus 765 for communicating information and command selections to processor 710. An additional user input device is cursor control device 780, such as a mouse, a trackball, stylus, or cursor direction keys coupled to bus 715 through bus 765 for communicating direction information and command selections to processor 710, and for controlling cursor movement on display device 770.

Another device, which may optionally be coupled to computer system 700, is a communication device 790 for accessing other nodes of a distributed system via a network. The communication device 790 may include any of a number of commercially available networking peripheral devices such as those used for coupling to an Ethernet, token ring, Internet, or wide area network. The communication device 790 may further be a null-modem connection, or any other mechanism that provides connectivity between the computer system 700 and the outside world. Note that any or all of the components of this system illustrated in FIG. 7 and associated hardware may be used in various embodiments of the present invention.

It will be appreciated by those of ordinary skill in the art that any configuration of the system may be used for various purposes according to the particular implementation. The control logic or software implementing the present invention can be stored in main memory 750, mass storage device 725, or other storage medium locally or remotely accessible to processor 710.

It will be apparent to those of ordinary skill in the art that the system, method, and process described herein can be implemented as software stored in main memory 750 or read only memory 720 and executed by processor 710. This control logic or software may also be resident on an article of manufacture comprising a computer readable medium having computer readable program code embodied therein and being readable by the mass storage device 725 and for causing the processor 710 to operate in accordance with the methods and teachings herein.

The present invention may also be embodied in a handheld or portable device containing a subset of the computer hardware components described above. For example, the handheld device may be configured to contain only the bus 715, the processor 710, and memory 750 and/or 725. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 710, a data storage device 725, a bus 715, and memory 750, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 710. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus comprising:
a design tool to enable a user to generate a customized skin for a three dimensional object;
a skinner to reduce the three dimensional object to a two-dimensional object representing a surface of the three dimensional object, and associated structure data defining a structure of the three dimensional object, wherein the associated structure data includes an identification of a shape associated with the three dimensional object;
a communications tool to send the two dimensional object and associated structure data to a recipient using a messaging protocol; and
a builder to utilize the received two dimensional object and the associated structure data to generate a received three dimensional object.

2. The apparatus of claim 1, wherein the two dimensional image file includes a subset of the skin, the subskin including an area that was edited by a user.

3. The apparatus of claim 2, wherein the metadata further includes location data for the subskin.

4. The apparatus of claim 1, wherein the three dimensional object is a platonic object.

5. The apparatus of claim 1, wherein the messaging protocol comprises a photograph sharing tool built into a mobile device.

6. The apparatus of claim 1, wherein the messaging protocol comprises multimedia messaging system (MMS) messaging.

7. A mobile cellular telephone device comprising:
a photo sharing framework designed to enable users to share photographs over a cellular telephone network;
a customized 3D object design/share tool, an output of the customized 3D object design/share tool designed to be sent via the photo sharing framework, the customized 3D object design/share tool including a skinner to generate a two dimensional image representing a surface of a customized three-dimensional object, and associated structure data defining a structure of the customized three-dimensional object, from the customized 3D object, the associated structure data defines a structure of the 3D object, including identification of a shape associated with the 3D object; and
a communications tool to enable sending of the two dimensional image and the associated structure data using the photo sharing framework.

8. The mobile device of claim 7, further comprising:
a subskin logic to generate a subset of the skin as a reduced size two dimensional image, the subskin including an area that was edited by a user, and the subskin sent by the communications tool.

9. The mobile device of claim 7, further comprising:
a subskin logic to generate a subset of the skin as a reduced size two dimensional image, and further to add to the metadata location data for the subskin.

10. The mobile device of claim 7, wherein the three dimensional object is a platonic object.

11. A customized 3D object tool for use on a mobile device to create and share 3-dimensional objects, the tool comprising:
a skinner to reduce the 3D object to an image file of a two-dimensional object representing a surface of the 3D object, the image file including metadata defining structure, the metadata including an identification of a shape associated with the three dimensional object;
a 3D object creator to enable a user to design a 3D object, selecting from a plurality of available shapes;
a sharing tool to send the image file and the metadata to a recipient, the sharing tool utilizing a common photo sharing mechanism on the mobile device, without requiring server infrastructure.

12. The tool of claim 11, further comprising:
a subskin logic to generate a subset of the skin as a reduced size two dimensional image, the subskin including an area that was edited by a user, and the subskin sent by the communications tool.

13. The mobile device of claim 11, further comprising metadata sent with the two dimensional image, the metadata defining a structure of the three dimensional object.

14. A method comprising:
generating a flat two-dimensional image of a 3D object, the flat image including a plurality of faces of the 3D object;
enabling a user to design a customized 3D object utilizing the flat image; and
sending the flat image and associated structure data defining the structure of the 3D object with a common photo sharing mechanism, to enable a user to share the customized 3D object with others;
wherein the associated structure data defines a structure of the 3D object, including identification of a shape associated with the 3D object.

15. The method of claim 14, further comprising:
generating an updated flat image, the updated flat image including a portion of the flat image that was altered by the user's design, the updated flat image sent with the common photo sharing mechanism.

16. The method of claim 14, further comprising:
enclosing structure data with the flat image.

17. The method of claim 16, wherein the structure data is enclosed as metadata attached to the flat image.

\* \* \* \* \*